Nov. 29, 1927.
G. S. KECK
1,651,133
DIRIGIBLE HEADLIGHT FOR AUTOMOBILES AND THE LIKE
Filed Feb. 5, 1926    2 Sheets-Sheet 1
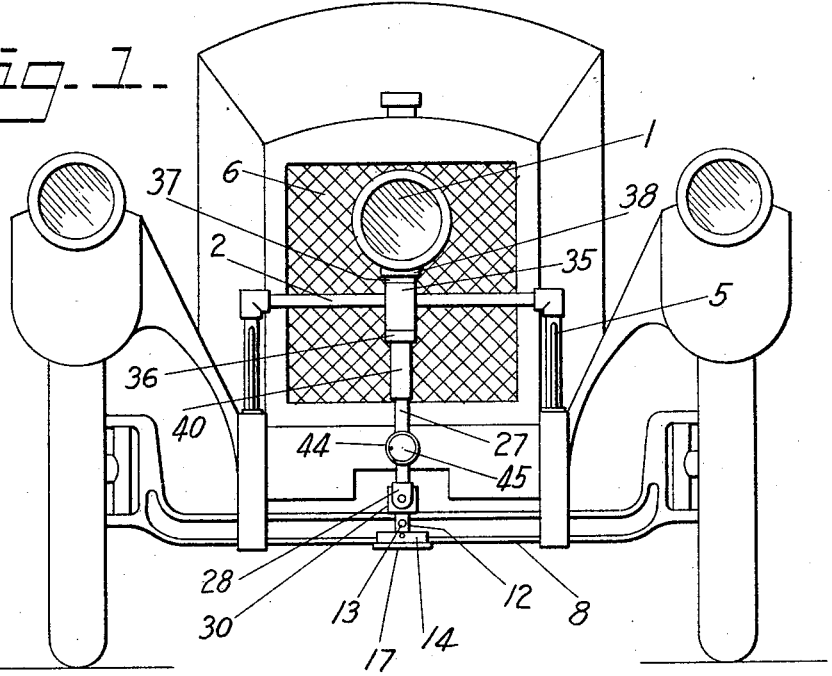
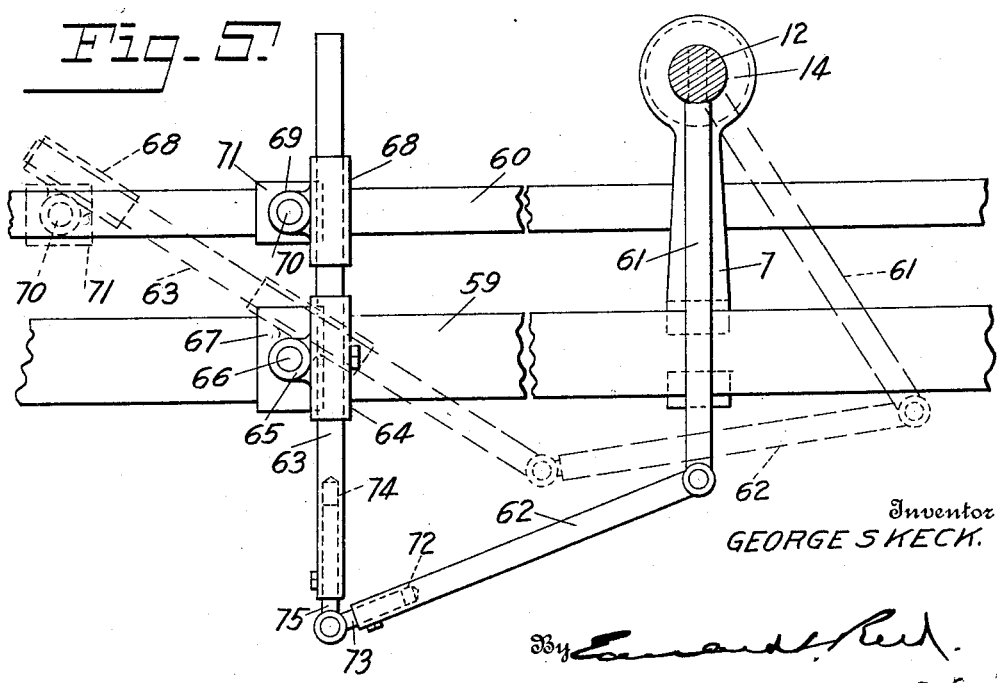
Inventor
GEORGE S KECK.

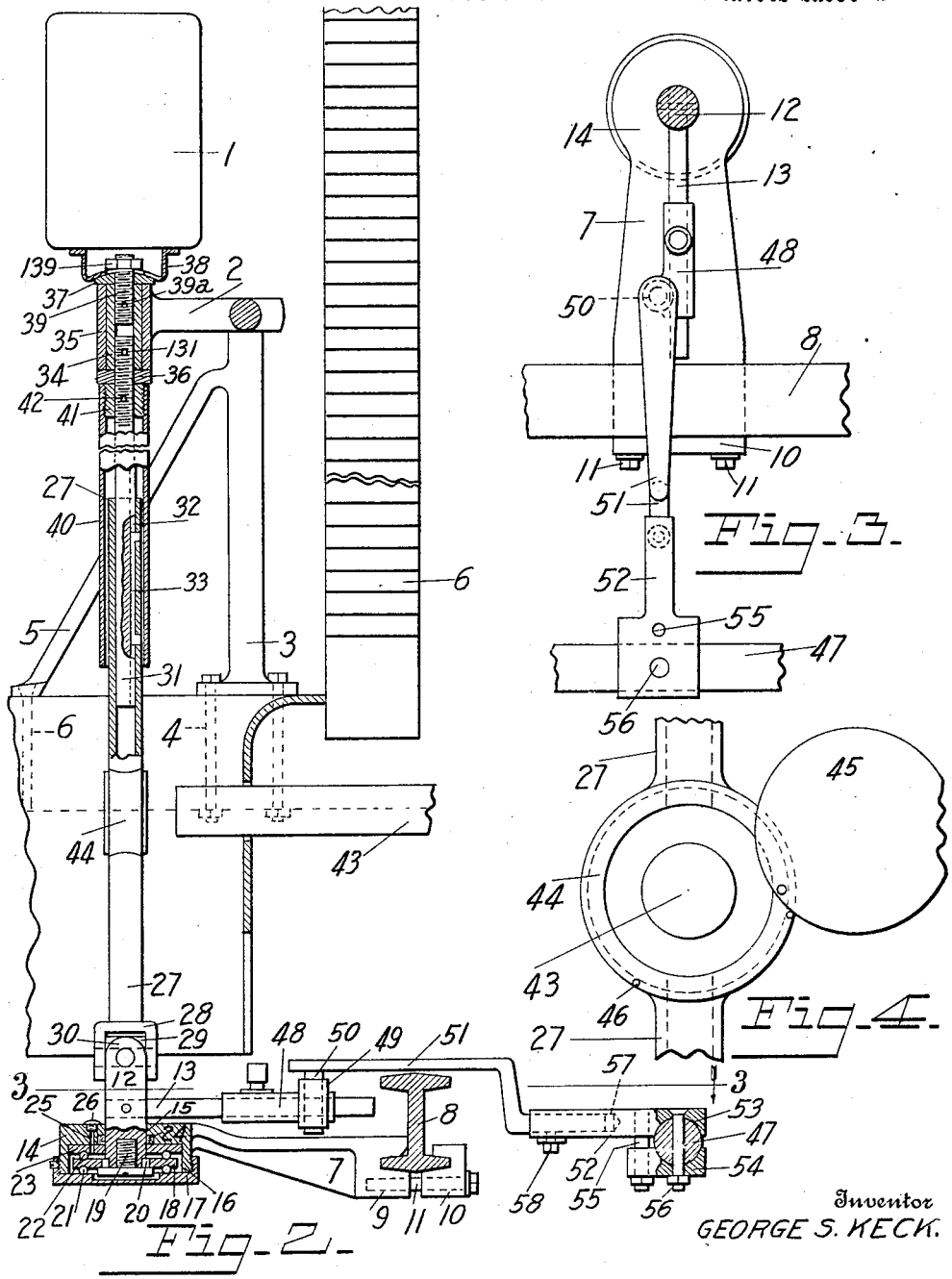

Patented Nov. 29, 1927.

1,651,133

UNITED STATES PATENT OFFICE.

GEORGE S. KECK, OF PASADENA, CALIFORNIA, ASSIGNOR TO THE INTERNATIONAL CONTROLLED LAMP COMPANY, OF WILMINGTON, DELAWARE, A CORPORATION OF DELAWARE.

DIRIGIBLE HEADLIGHT FOR AUTOMOBILES AND THE LIKE.

Application filed February 5, 1926. Serial No. 86,117.

This invention relates to dirigible headlights for automobiles and the like.

One object of the invention is to provide a single dirigible lamp mounted centrally of the automobile, between the standard headlights, and so connected with the steering mechanism that it will be turned in the direction in which the automobile is to turn, the circuits for this dirigible light being controlled independently of the standard lights so that the dirigible lamp may be used either in connection with or independently of the standard lights.

A further object of the invention is to provide a dirigible headlight with operating mechanism therefore which will be very simple in construction and positive in operation; and which may be easily installed on existing automobiles.

A further object of the invention is to provide operating mechanism for a dirigible light of such a character that the amount of movement imparted to the headlight by the steering mechanism may be regulated.

A further object of the invention is to provide a single centrally arranged dirigible headlight the supporting and operating mechanism of which will be of such a character as not to interfere with the hand cranking of the automobile.

Other objects of the invention will appear as the apparatus is described in detail.

In the accompanying drawings Fig. 1 is an elevation of the front end of an automobile showing my dirigible headlight applied thereto; Fig. 2 is a vertical sectional view taken through the forward part of an automobile showing a headlight embodying my invention applied thereto; Fig. 3 is a sectional view taken on the line 3—3 of Fig. 2 showing the actuating device in plan; Fig 4 is a detail view of a portion of the connecting device; and Fig. 5 is a plan view of a modified form of connection for the actuating device and the steering mechanism.

In these drawings I have illustrated one embodiment of my invention and have shown the same as comprising a single headlight mounted substantially centrally of the automobile, in front of the radiator, and having operative connection with an actuating device which is supported by the axle and which is operatively connected with the drag bar of the steering mechanism. It will be understood, however, that the supporting and operating mechanism for the headlight is not limited in its use to a single headlight and that this mechanism may take various forms without departing from the spirit of the invention.

The lamp may be of any suitable character but, is here shown at 1 as conforming substantially in construction to the lamp of a standard headlight. This lamp may be supported in any suitable position on the main frame of the automobile but when a single lamp is employed I prefer to mount the same substantially centrally of the automobile in front of the radiator. In the present construction the lamp is supported by a transverse bracket 2 which is supported on the frame of the automobile by means of standards 3, which are rigidly secured at their upper ends to the adjacent ends of the bracket or cross bar 2 and are secured at their lower ends to the frame by bolts 4. If desired, the standards may be reinforced by braces 5, here shown as formed integral with the standards and secured to the frame by bolts 6.

The lamp 1 is mounted for rotation about a vertical axis and is operatively connected with a suitable actuating device, which is here shown as carried by a bracket 7 rigidly secured to and projecting forwardly from the axle 8 of the automobile. In the present construction the bracket is provided at its rear end with an integral clamping member 9 to which a movable clamping member 10 is secured by means of a bolt 11, these clamping members being adapted to embrace a portion of the axle and to be tightly clamped thereon by the bolt 11. At its forward end the bracket 7 is provided with a vertical bearing arranged substantially in line with the axis of the lamp 1. An actuating device comprising a vertical stud 12 and a transverse lever 13, rigidly secured to the stud, is mounted in the bearing and connected with the lamp. In the particular construction here illustrated the bracket 7 has at its outer end a disk-like portion 14 constituting the top wall of the bearing and having an opening 15 therein through which the stud 12 may extend and having a depending circumferential flange 16. Screw threaded onto this flange 16 is a cap 17 which constitutes the bottom wall of the bearing. The stud 12 extends loosely through the opening 15 in the top wall 14 of the bearing so as to be freely rotatable therein and has rigidly secured to its lower end a bearing plate 18, which is rotatably mounted between the top and bottom walls of the bearing. A screw 19 threaded into the lower end of the stud 12 serves to hold the plate 18 on the stud and this plate is held against rotary movement with relation to the stud by means of keys 20. I prefer that the bearing should be of the anti-friction type, and, as here shown, the bearing plate 18 is spaced from the bottom plate 17 and bearing balls 21 interposed between the bottom wall and the bearing plate, both parts being provided with annular grooves to constitute ball races. Similar bearing balls 22 are interposed between the bearing plate and the top wall of the bearing but, in the present instance, I have mounted in the upper portion of the bearing a separate fixed bearing plate or wear plate 23, this wear plate and the bearing plate 18 being provided with annular grooves to constitute ball races. The top plate 14 of the bearing has, at the inner end of the opening 15, an annular recess to receive packing material 24, such as felt, to prevent the entrance of dust or other foreign matter into the bearing. The top wall 14 of the bearing and the fixed bearing plate 23 are provided with an oil opening 25 which is normally closed by a screw 26. This bearing constitutes a very strong durable support for the actuating device and permits the actuating device to have free rotation therein.

A vertically extending device connects the stud 12 of the actuating device with the lamp and this connecting device is of such a character that it will automatically adjust itself longitudinally to accommodate the same to the relative vertical movements of the axle and the frame of the automobile. In the present instance, the connecting device comprises two members slidably connected one to the other and held against rotation. The lower member 27 is tubular in form and has at its lower end a yoke 28 the arms of which embrace and are pivotally secured to a bearing block 29. The upper end of the stud 12 is also provided with a yoke 30, arranged at right angles to the yoke 28 of the connecting device, and the arms of which embrace and are pivotally connected with the bearing block 29. In this manner a universal connection is provided between the stud 12 of the actuating device and the connecting device. Slidably mounted in the tubular member 27 is a rod 31 which is connected at its upper end with the lamp 1. The rod 31 and the tubular member 27 may be held against relative rotation in any suitable manner, but, as here shown, the rod has a longitudinal groove 32 to receive a feather 33 rigidly secured to the member 27. The rod 31 of the connecting device may be attached to the lamp in any suitable manner but, in the present construction, I have rigidly secured to the upper end thereof a sleeve 34 which is journaled in a vertical socket or bearing 35 in the bracket 2. The upper end of the rod 31 is threaded into the lower portion of the sleeve and is rigidly secured therein by means of a pin 131. A nut 36 threaded onto the rod 31 in contact with the lower end of the sleeve 34 serves to retain the sleeve in proper position within the bearing 35. Supported on the upper end of the sleeve is a bearing block 37 having a convex upper surface on which rests the concave lower surface of a supporting bracket 38 rigidly secured to the lower side of the lamp 1. A bolt 39 extends through the supporting member 38 and bearing block 37 and is threaded into the upper portion of the sleeve 34 and may be rigidly secured therein by a pin 39$^a$. A nut 139 is threaded on to the upper end of the bolt to clamp the parts 38 and 37 against the sleeve. The opening in the supporting member 38 is of greater diameter than the thickness of the bolt 39 so that the lamp can be adjusted with relation to the actuating device, thus permitting the lamp to be tilted forward, if desired, and then rigidly secured in this position by tightening down the nut 139. If desired, a wedge 140 may be inserted between the supporting bracket 38 and the bearing block 37 to positively retain the lamp in its tilted position. The upper end of the tubular member 27 of the connecting device terminates some distance below the upper end of the rod 31 so as to provide for the maximum movement of the frame of the automobile with relation to the axle thereof and in order to prevent the entrance of dust or other foreign matter into the telescoping connecting device I have placed about the upper end of the tubular member 27 a shield 40. This shield is here shown as tubular in form and has its upper end screw threaded onto a bushing 41 which in turn is threaded onto the upper portion of the rod 31 below the lock nut 36 and may, if desired, be rigidly secured thereto by a pin 42. This tubular guard fits loosely about the lower member 27 of the connecting device so that it will move freely with the rod and is of such a length that its lower end will not be lifted above the upper end of the member 27 by the maximum upward movement of the frame with relation to the axle. The upper end of the shield 40 is secured tightly against the nut 36 and acts as a lock nut to secure the nut 36 in proper position on the rod 31, in which position there will be just enough clearance between the nut 36 and the end of the bearing 35 to avoid frictional contact.

When the lamp is centrally arranged with relation to the automobile, as shown in the present instance, the connecting device will lie directly in front of the cranking shaft 43 of the automobile. In order to avoid any interference with the application of the hand crank to this shaft I have provided the tubular member of the connecting device with an annular portion or ring 44 which is so arranged that when the frame and axle are in their normal positions this annular portion will lie directly in line with the cranking shaft 43, thus permitting the hand crank to be extended through the connecting device and applied to the shaft 43. To prevent the entrance of dust or foreign matter into the tubular member 27 I have mounted on each side of the annular portion 44 thereof a disk-like cover plate 45 which is supported normally in its closed position by means of a pin 46.

The actuating device may be connected with any suitable part of the steering mechanism which will cause the lamp to be turned in the direction in which the wheels are turned but I prefer to connect the same with the drag bar 47 which forms part of the steering mechanism of the automobile. In the present apparatus a sleeve 48 is slidably mounted on the lever 13 of the actuating device and has therein a vertical bearing socket 49. Mounted in this vertical bearing is a stud 50 carried by an arm 51 which extends rearwardly across the axle 8 and is connected at its rear end with the drag bar. As here shown, this bar is formed in two parts and the rear part 52 thereof is recessed, as shown at 53, to fit about the upper side of the drag bar and has associated therewith a clamping member 54 recessed to fit about the lower side of the drag bar. The clamping plate 54 is secured to the part 52 of the arm by a bolt 55 and, if desired, a bolt 56 may be extended through the two parts of the clamp and through the drag bar to provide a permanent and rigid connection. It will be understood that, when the steering mechanism is operated, lengthwise movement is imparted to the drag bar in a direction transverse to the length of the automobile and the arm 51 will be carried with the drag bar, thereby moving the lever 13 of the actuating device about the axis of the actuating device, this movement being permitted by the pivoted and slidable connection between the arm 51 and the lever 13. The amount of movement which will be imparted to the stud 12 and consequently to the lamp 1 by a given movement of the drag bar may be regulated by varying the length of the connecting arm 51—52. As here shown the part 52 of the arm has an axial bore 57 into which the rear end of the part 51 of the arm extends and within which it is secured in adjusted positions by means of a set screw 58. It will be apparent that when the length of the actuating arm 51—52 is increased the effective length of the lever 13 will be shortened and consequently this lever will be moved through a greater arc by a given movement of the drag bar.

In some automobiles the drag bar for the steering mechanism is arranged in front of the axle and under such circumstances a different form of connection between the drag bar and the actuating device is necessary. In Fig. 5 I have shown an arrangement of connecting mechanism adapted for use with a drag bar in front of the axle. In that figure the axle is shown at 59 and the drag bar at 60. The bracket 7 and actuating device are mounted in the same manner as above described but the lever of the actuating device, which is shown at 61, extends rearwardly to a point in the rear of the axle and is there pivotally connected with one end of a link 62, the other end of which is pivotally connected with lever 63. This lever is pivotally mounted on the axle 59 for movement about a vertical axis and, as here shown, is rigidly mounted in a sleeve 64 having a vertical bearing 65 to receive a stud 66 which is carried by a bracket 67 rigidly secured to the axle, so that the lever 63 will move about the axis of the stud 66. The lever extends forwardly from the axle across the drag bar 60 and has slidably mounted thereon a second sleeve 68 which has a vertical bearing 69 to receive a stud 70 carried by a bracket 71 rigidly secured to the drag bar so that as the drag bar is moved lengthwise the sleeve will accommodate itself to the changed position of the lever 63. In this arrangement of the mechanism the drag bar moves in the direction in which the wheels are turned and consequently the light is to be turned in the same direction as the drag bar moves. As shown in dotted lines the movement of the drag bar to the left in Fig. 5 will move the lever 63 about its axis and cause the lever 61 to be moved to the right, thus turning the actuating device 12 and consequently the lamp in the same direction that the drag bar moves. To regulate the amount of movement imparted to the headlight by a given movement of the drag bar the connection between the link 62 and the lever 63 is made adjustable. To this end the link 62 is provided with an axial bore 72 in which is rigidly but adjustably mounted a rod 73 and the lever 63 is provided with an axial bore 74 in which is rigidly but adjustably mounted a rod 75, the outer end of which is pivotally connected to the outer end of the rod 73, this connection constituting the connection between the link and the lever.

By adjusting the rods 73 and 75 with relation to the link and to the lever 63, respectively, the length of the lever 63 may be varied and the movement of the actuating lever 61 regulated.

While I have shown and described one embodiment of my invention, together with a modified form of actuating device, I wish it to be understood that I do not desire to be limited to the details thereof as various modifications may occur to a person skilled in art.

Having now fully described my invention, what I claim as new and desire to secure by Letters Patent, is:

1. A dirigible headlight comprising a lamp, means for supporting said lamp on the frame of an automobile and comprising a vertical bearing, a bracket having means for securing the same to the axle of said automobile in a position in which the bracket will extend forwardly from said axle, said bracket having a vertical bearing at its forward end arranged substantially in line with the first mentioned bearing, an actuating device mounted in the bearing in said bracket and comprising a lever, an operating device having means for connecting the same with said lever and with a part of the steering mechanism of said automobile, a connecting device comprising members slidably connected one to the other and held against relative rotation, means for pivotally connecting one of said members with said actuating device, the other of said members having a part journaled in the first mentioned bearing, and means for securing said lamp to said part of said member of said connecting device.

2. A dirigible headlight comprising a lamp, means for supporting said lamp on the frame of an automobile and comprising a vertical bearing, a bracket having means for securing the same to the axle of said automobile in a position in which the bracket will extend forwardly from said axle, said bracket having a vertical bearing at its forward end arranged substantially in line with the first mentioned bearing, an actuating device mounted in the bearing in said bracket and comprising a lever, an operating device having means for connecting the same with said lever and with a part of the steering mechanism of said automobile, a connecting device comprising members slidably connected one to the other and held against relative rotation, means for pivotally connecting one of said members with said actuating device, a sleeve rigidly secured to the other of said members and journaled in the first mentioned bearing, a head supported by said sleeve and having a convex surface, a supporting bracket rigidly secured to said lamp and having a concave surface to engage the convex surface of said head, said supporting bracket having an opening therethrough, and a bolt extending through said opening and threaded into said sleeve to rigidly but adjustably connect said lamp with said sleeve.

3. A dirigible headlight comprising a lamp, means for supporting said lamp on the frame of an automobile for movement about a vertical axis, a bracket having means for securing the same to the axle of said automobile and having a vertical bearing arranged substantially in line with the axis of said lamp, an actuating device journaled in the bearing of said bracket and comprising a lever, a longitudinally extensible connecting device connected at one end with said actuating device and at its other end with said lamp, and means for operatively connecting the lever of said actuating device with a part of the steering mechanism of said automobile and for regulating the movement imparted to said actuating device by said steering mechanism.

4. A dirigible headlight comprising a lamp, means for supporting said lamp on the frame of an automobile for movement about a vertical axis, a bracket having means for securing the same to the axle of said automobile and having a vertical bearing arranged substantially in line with the axis of said lamp, an actuating device journaled in the bearing of said bracket and comprising a lever, a longitudinally extensible connecting device connected at one end with said actuating device and at its other end with said lamp, an operating member having means for connecting the same with the drag bar forming a part of the steering mechanism of an automobile and with the lever of said actuating device, said operating member having means for varying the length thereof to regulate the movement imparted to said actuating device by said drag bar.

5. A dirigible headlight comprising a lamp, means for supporting said lamp on the frame of an automobile for movement about a vertical axis, a bracket having means for securing the same to the axle of said automobile and having a vertical bearing arranged substantially in line with the axis of said lamp, an actuating device journaled in the bearing of said bracket and comprising a lever, a longitudinally extensible connecting device connected at one end with said actuating device and at its other end with said lamp, a sleeve slidably mounted on the lever of said actuating device, an arm having means for rigidly securing the same to a drag bar forming part of the steering mechanism of said automobile, and means for pivotally connecting said arm with the sleeve on said lever.

6. A dirigible headlight comprising a lamp, means for supporting said lamp on the frame of an automobile for movement about a vertical axis, a bracket having means for securing the same to the axle of said automobile and having a vertical bearing arranged substantially in line with the axis of said lamp, an actuating device journaled in the bearing of said bracket and comprising a lever, a longitudinally extensible connecting device connected at one end with said actuating device and at the other end with said lamp, an arm comprising two parts, one part having means for rigidly securing the same to the drag bar forming part of the steering mechanism of an automobile, means for pivotally connecting the other part of said arm with the sleeve on said lever, and means for rigidly but adjustably connecting the two parts of said arm one to the other.

7. A dirigible headlight comprising a lamp, means for supporting said lamp on the frame of an automobile for movement about a vertical axis, a bracket having means for securing the same to the axle of an automobile and having at its forward end a bearing plate having a central opening therethrough, a circumferential flange extending downwardly from said bearing plate, a cap screw threaded onto said flange to form the bottom plate of said bearing, a stud extending through the opening in the first mentioned bearing plate, a bearing plate rigidly secured to the inner end of said stud and arranged between the upper and lower bearing plates of said bearing, an extensible connecting device having one end connected with said stud and the other end connected with said lamp, a lever secured to said stud, and means for operatively connecting said lever with the drag bar forming a part of the steering mechanism of said automobile.

8. The combination with an automobile comprising an axle, a frame mounted above said axle for movement toward and from the same, and steering mechanism, of standards rigidly secured to said frame and spaced apart, a bracket supported by said standards and having a vertical bearing, a supporting member rigidly secured to said axle and having a bearing arranged in line with the first mentioned bearing, means for operatively connecting said actuating device with a part of said steering mechanism, a connecting device comprising telescoping members held against rotation with relation one to the other, one of said members being pivotally connected with said actuating device and being rotatable therewith, and the other of said members being journaled in the first mentioned bearing, and a lamp carried by the last mentioned member of said connecting device.

9. The combination with an automobile comprising an axle, a frame mounted above said axle for movement toward and from the same, and steering mechanism including a drag bar, of a transverse bracket rigidly mounted on said frame and spaced above said axle and having a vertical bearing, a supporting member rigidly secured to said axle and having a vertical bearing arranged in line with the first mentioned bearing, an actuating device journaled in the last mentioned bearing and comprising a lever for rotating the same, means for operatively connecting said lever with said drag bar, a tubular member, a universal joint connecting said tubular member with said actuating device for rotation therewith, a rod slidably mounted in said tubular member and having a part journaled in the first mentioned bearing, and a lamp connected with said rod and supported above said first mentioned bearing.

10. A dirigible headlight comprising a lamp, means for supporting said lamp on the frame of an automobile, and comprising a vertical bearing, a bracket having means for securing the same to the axle of said automobile in a position in which the bracket will extend forwardly from said axle, said bracket having a vertical bearing at its forward end arranged substantially in line with the first mentioned bearing, an actuating device mounted in the bearing in said bracket and comprising a lever, an operating device having means for connecting the same with said lever and with a part of the steering mechanism of said automobile, a connecting device comprising a tubular member, a universal joint connecting said tubular member with said actuating device, a rod slidably mounted in said tubular member, held against rotation with relation thereto, extending above the same, and having its upper end screw threaded, a sleeve screw threaded onto said rod and journaled in the first mentioned bearing, means for rigidly securing a lamp to said sleeve, a nut mounted on said rod and engaging the lower end of said sleeve, a bushing mounted on said rod below said nut, and a tubular guard screw threaded onto said bushing and engaging the lower side of said nut and extending downwardly about the upper portion of said tubular member.

11. A dirigible headlight mechanism for an automobile, comprising an upper bracket having means for rigidly mounting the same on an automobile at the front end thereof and having a vertical bearing, a lower bracket having means for rigidly securing the same to the axle of said automobile in a position in which it will extend forwardly therefrom, said lower bracket having a bearing, an actuating device mountetd in the bearing of said lower bracket and comprising a stud extending above said bearing, a connecting device comprising two members slidably connected one to the other and held against relative rotation, means for pivotally connecting one of said members with said stud, the other member of said connecting device having a part journaled in the bearing of said upper bracket, a lamp, means for rigidly securing said lamp to said part of said rod, and means for operatively connecting said actuating device with the steering mechanism of said automobile.

12. A dirigible headlight mechanism for an automobile, comprising an upper bracket having means for rigidly mounting the same on an automobile at the front end thereof and having a vertical bearing, a lower bracket having means for rigidly securing the same to the axle of said automobile in a position in which it will extend forwardly therefrom, said lower bracket having a bearing, an actuating device mounted in the bearing of said lower bracket and comprising a stud extending above said bearing, a connecting device comprising two members slidably connected one to the other and held against relative rotation, means for pivotally connecting one of said members with said stud, the other member of said connecting device having a part journaled in the bearing of said upper bracket, a lamp, means for rigidly securing said lamp to said part of said rod, said securing means being adjustable to permit said lamp to be tilted, and means for operatively connecting said actuating device with the steering mechanism of said automobile.

13. A dirigible headlight comprising a lamp, means for supporting said lamp on the frame of an automobile and comprising a vertical bearing, a bracket having means for securing the same to the axle of said automobile in a position in which it will extend forwardly therefrom and having a bearing, an actuating device mounted in the bearing of said bracket, a connecting device comprising two members slidably connected one to the other and held against relative rotation, means for connecting one of said members with said actuating device, an operative connection between said actuating device and the steering mechanism of said automobile, the other member of said connecting device having a part journaled in the first mentioned bearing, a head supported by the last mentioned member of said connecting device and having a convex surface a supporting bracket rigidly secured to said lamp and having a concave surface to engage the convex surface of said head, and means for rigidly securing said lamp bracket in adjusted positions on said head.

14. A dirigible headlight comprising a lamp, means for supporting said lamp on the frame of an automobile for movement about a vertical axis, a bracket having means for securing the same to the axle of an automobile in a position in which said lamp will extend forwardly from said axle, said bracket having a vertical bearing at its forward end, an actuating device mounted in said bearing and comprising a lever, an operating device having means for connecting the same with the steering mechanism of said automobile and for slidably connecting the same with said lever, a connecting device comprising members slidably connected one to the other and held against relative rotation, means for connecting one of said members with said actuating device, and an operative connection between the other of said members and said lamp.

15. A dirigible headlight comprising a lamp, means for supporting said lamp on the frame of an automobile and comprising a vertical bearing, a bracket having means for securing the same to the axle of an automobile in a position in which the bracket will extend forwardly from said axle, said bracket having a vertical bearing, an actuating device mounted in the bearing in said bracket, means for operatively connecting said actuating device with a part of the steering mechanism of said automobile, a connecting device comprising a tubular member, means for connecting said tubular member with said actuating device, a rod slidably mounted in said tubular member, held against rotation with relation thereto and having a part journaled in the first mentioned bearing, means for rigidly securing said lamp to said part of said rod, and a tubular guard carried by said rod and extending downwardly about the upper portion of said tubular member.

16. A dirigible headlight comprising a lamp, means for supporting said lamp on the frame of an automobile and comprising a vertical bearing, a bracket having means for securing the same to the axle of an automobile in a position in which it will extend forwardly from said axle, said bracket having a vertical bearing, an actuating device mounted in the bearing in said bracket, means for operatively connecting said autuating device with a part of the steering mechanism of said automobile, a connecting device comprising a tubular member, means for connecting said tubular member and said actuating device, a rod slidably mounted in said tubular member and held against rotation with relation thereto and extending above the same, said rod having a part journaled in the first mentioned bearing, means for connecting a lamp with a part of said rod, a bushing mounted on said rod below said first mentioned bearing, and a tubular guard secured to said bushing and extending downwardly about the upper end of said tubular member.

17. A dirigible headlight comprising a lamp, means for supporting said lamp on the frame of an automobile for movement about a vertical axis, a bracket having means for securing the same to the axle of an automobile and having a vertical bearing, an actuating device mounted in said bearing, means for operatively connecting said actuating device with a part of the steering mechanism of said automobile, a connecting device comprising a tubular member having a transverse opening of relatively large diameter therethrough, means for pivotally connecting said tubular member with said actuating device, movable guards mounted on said tubular member to close the respective sides of said opening, a rod slidably mounted in said tubular member and held against rotation with relation thereto, said rod having a part journaled in said bearing, and means for securing a lamp to said part of said rod.

In testimony whereof, I affix my signature hereto.

GEORGE S. KECK.